United States Patent Office 2,931,670
Patented Apr. 5, 1960

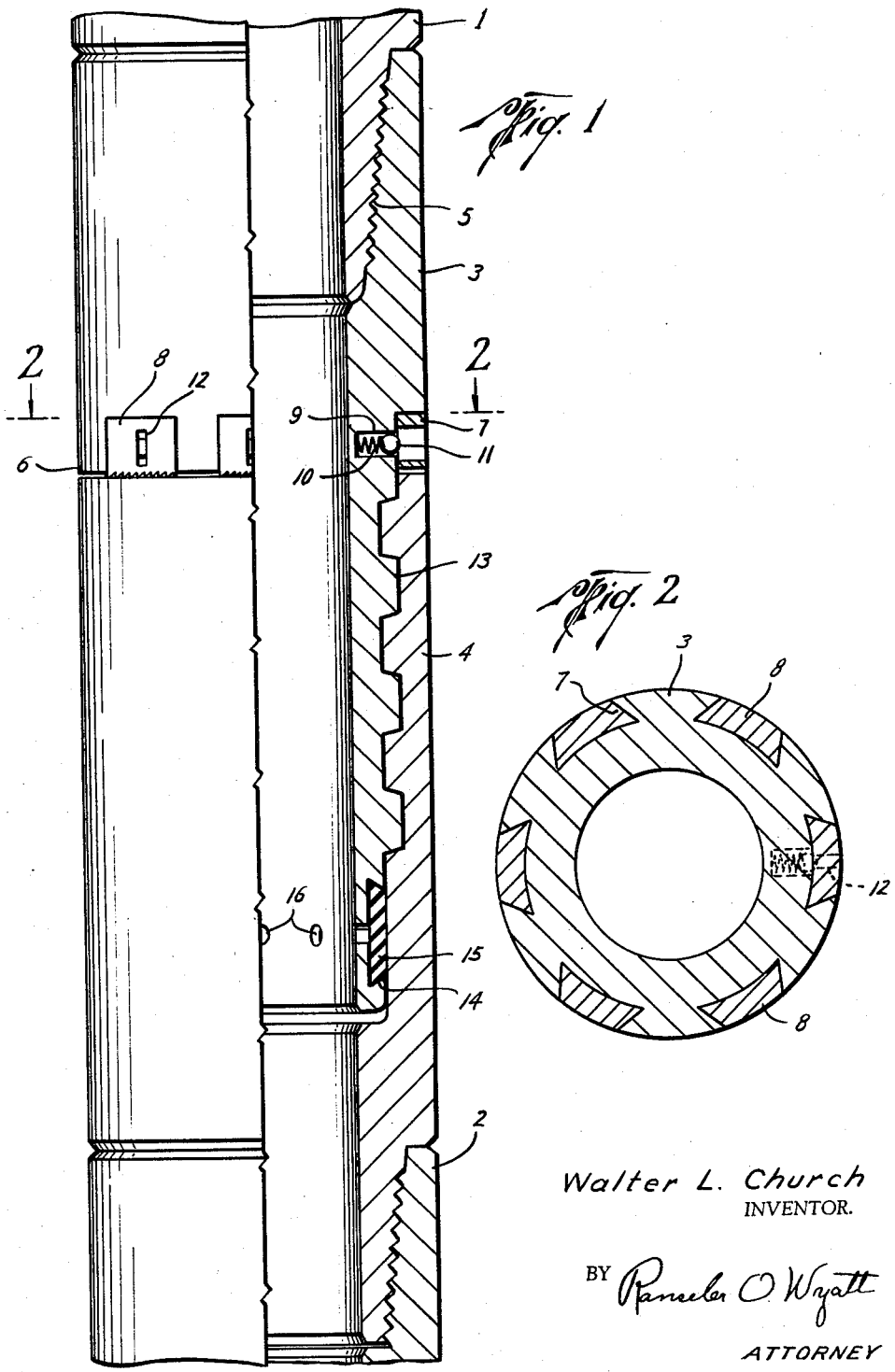

2,931,670

FLUID TIGHT PIPE JOINT WITH REPLACEABLE MEANS FOR PREVENTING OVERTIGHTENING

Walter L. Church, Houston, Tex.

Application October 1, 1956, Serial No. 613,332

1 Claim. (Cl. 285—81)

This invention relates to a pipe joint and has particular relation to novel means for connecting pipe sections, or rod sections, together whereby they may be easily separated.

An object of this invention is to provide a connection for pipes or rods, one of the connected sections having a series of toothed inserts formed of very hard material and the other of said sections having a shoulder arranged opposite the inserts and formed of softer material to the end that when the sections are screwed together, the teeth of the inserts will bite into the softer material to prevent the threaded pipe from becoming too tightly screwed together whereby the threaded pipe may be readily separated.

It is another object of this invention to provide in a pipe coupling, or connection, means for forming a fluid tight joint, whereby gritty fluid flowing under pressure through said joint may be excluded from the threads connecting the pipe sections.

With the above and other objects in view, the invention has relation to certain novel features of construction, arrangement of parts and use, an example of which is given in this specification and illustrated in the accompanying drawings, wherein:

Figure 1 is an elevational view, in cross section, and
Figure 2 is a cross sectional end view taken on the line 2—2 of Figure 1.

Referring now more particularly to the drawings, the numerals 1, 2 designate sections of pipe to be connected. As shown, these sections are connected by the pin and box tool joint members 3 and 4. The section 1 is connected into the threaded end of the pin member 3 as at 5 and in the reduced shoulder 6 of the pin member 3 are a series of dove tailed slots 7 in which toothed inserts 8 of a very hard material are seated. The inserts 8 may be retained in place by any suitable means such as by the chamber 9 formed in the member 3 in which a spring 10 and ball 11 are mounted. The inserts 8 may be provided with the ports 12 so that when forced into place in the slots 7, the ball 11 will be yieldably seated in the port 12 and when it is desired to remove the inserts 8, an instrument may be inserted through the ports 12 and the ball 11 moved out of its seat in the port 12 and the insert removed.

The threads 13 connecting the joint members will be prevented from becoming too tightly screwed together by the teeth of the inserts 8 biting into the soft material of the member 4.

Adjacent the lower end of the joint member 3 is a dovetail groove 14, formed in the wall thereof, and in which a packing ring of resilient material as 15 is seated. A series of ports 16 extend through the wall of the member 3 and terminate against the packing 15. When the fluid under pressure enters the tool joint, the pressure will extend against the packing 15 through the ports 15 forcing the packing against the member 4 and forming a fluid tight seal.

While the foregoing is considered a preferred form of the invention, it is by way of illustration only, the broad principle of the invention being defined by the appended claim.

What I claim is:

A pipe joint composed of two sections connected by threads, one of said sections being externally reduced forming a pin and shoulder, the reduced portion being externally threaded, the other section being internally threaded to receive said pin, said shoulder having a series of dove tail slots, a series of inserts mounted in the said slots and detachably anchored therein, chambers in said section, each chamber terminating at one end in one of said slots, a spring mounted in said chamber and a ball on said spring yieldably maintained against said insert the toothed portion of said inserts extending downwardly beneath the external surface of said shoulder, the internally threaded section being of a softer material than the material of the inserts and into which the teeth of said inserts sets when the parts are moved into assembled relation and slots in said inserts which partially receive said balls and through which said balls may be moved out of contact with said insert.

References Cited in the file of this patent

UNITED STATES PATENTS

| | | |
|---|---|---|
| 591,424 | Postmus | Oct. 12, 1897 |
| 762,226 | Blackburn | June 7, 1904 |
| 1,077,425 | Old | Nov. 4, 1913 |
| 1,081,549 | Mulon | Dec. 16, 1913 |
| 1,093,316 | Convery | Apr. 14, 1914 |
| 1,350,078 | McCullor | Aug. 17, 1920 |
| 1,741,969 | Bellows | Dec. 31, 1929 |
| 1,776,280 | Boyd | Sept. 23, 1930 |
| 1,854,215 | Mueller | Apr. 19, 1932 |
| 2,075,427 | Church | Mar. 30, 1937 |
| 2,348,380 | Graham | May 9, 1944 |
| 2,440,257 | Edwards | Apr. 27, 1948 |
| 2,461,107 | Church | Feb. 8, 1949 |
| 2,596,594 | Petre | May 13, 1952 |
| 2,641,479 | Gabriele | June 9, 1953 |